United States Patent Office 3,313,772
Patented Apr. 11, 1967

3,313,772
POLYOLEFINS STABILIZED WITH (A) A CYCLO-
ALKYL SUBSTITUTED BENZOPHENONE, BIPHE-
NOL, OR OXYDIPHENOL AND OPTIONALLY (B)
A DIALKYL THIODIALKANOATE
Rodney D. Moss, Indianapolis, Ind., David A. Gordon,
Scarsdale, N.Y., and John M. Corbett, Midland, Mich.,
assignors to The Dow Chemical Company, Midland,
Mich., a corporation of Delaware
No Drawing. Original application May 17, 1962, Ser.
No. 195,391, now Patent No. 3,234,285, dated Feb. 8,
1966. Divided and this application Sept. 9, 1965, Ser.
No. 486,188
7 Claims. (Cl. 260—45.85)

This is a division of application Ser. No. 195,391, filed May 17, 1962, now Patent 3,234,285, issued Feb. 8, 1966.

This invention is concerned with thermoplastic compositions comprising polymerized α-olefins stabilized against oxidative degradation with bis(cycloalkylphenols) having the structure

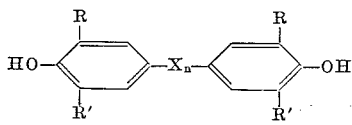

wherein R is cycloalkyl of 4–8 carbon atoms, R' is hydrogen, lower alkyl of 1–4 carbon atoms, or cycloalkyl of 4–8 carbon atoms, $n$ is zero or one, and X is oxygen or carbonyl.

These compounds may be prepared by a number of known methods for making compounds of this general nature. A particularly satisfactory synthesis of the compounds described above comprises the alkylation of a suitable diphenol by reacting it with about 2.0–2.5 molar proportions of a cycloalkene in the presence of a catalytic quantity of an acidic alkylation catalyst such as aluminum chloride, ferric chloride, or an acid activated clay such as Retrol, this preferably in the presence of a small amount of sulfuric acid. The reaction is carried out at about 150–250° C., usually under the autogenous pressure of the system. Cycloalkenes such as cyclobutene, cyclopentene, cyclohexene, cycloheptene, cyclooctene, and alkyl derivatives of these may be reacted in this way with diphenols such as p,p-biphenol, p,p'-oxydiphenol, 4,4'-dihydroxybenzophenone, and alkyl or cycloalkyl substituted derivatives of these having at least one reactive unsubstituted position on each benzene ring ortho to the hydroxyl group.

The bis(cycloalkylphenol) products obtained from this reaction are colorless or nearly colorless high-boiling liquids of extremely high viscosity which are crystallizable with difficulty. They are more or less soluble in the common organic solvents and insoluble in water. They possess bactericidal and fungicidal properties and so are useful components of antimicrobial compositions. They are also useful as intermediates in the preparation of polyesters and they may be reacted with olefin oxides such as ethylene oxide and propylene oxide to make polyethers of various molecular weights. They have been found to possess particular and unexpectedly high utility as stabilizers when incorporated into essentially linear polymers of α-olefins such as ethylene and propylene. The relatively high thermal stability of these bisphenols makes them unusually effective in this application. Particularly preferred for this use are the bisphenols where R' is hydrogen. These compounds show generally higher stabilizing efficiencies and have the economic advantage of being easier and cheaper to prepare than those having additional substituents.

The following examples illustrate various aspects of the invention.

EXAMPLE 1

4,4'-oxybis(2-cyclohexylphenol)

A mixture of 60.4 g. of p,p'-oxydiphenol, 53.3 g. of freshly distilled cyclohexene, 2.0 g. of Retrol acid activated clay, and one drop of concentrated sulfuric acid was loaded into a bomb and heated under autogenous pressure at 170–180° C. for 15 hours. The viscous reaction mixture was filtered and distilled through a short Vigreux column under high vacuum to yield 52.5 g. of 4,4'-oxybis(2-cyclohexylphenol) as a clear, colorless and very viscous liquid, B.P. 230–238° C./0.1–0.15 mm. The structure of the product was confirmed by infrared examination. Elemental analysis showed: carbon, 78.23% and hydrogen, 7.90%. The calculated values are carbon, 78.6% and hydrogen, 8.19%.

EXAMPLE 2

3,3'-dicyclohexyl-4,4'-dihydroxybenzophenone

A mixture of 107.1 g. of 4,4'-dihydroxybenzophenone, 98.4 g. of freshly distilled cyclohexene, 2 g. of Retrol, and two drops of concentrated sulfuric acid was heated in a sealed bomb at 275–285° C. for 15 hours. After the bomb had been cooled and opened, the viscous reaction mixture was removed, filtered, and distilled under high vacuum. The distilled product was a viscous light straw colored liquid, weight 41 g., B.P. 200–223° C./0.1–0.2 mm. This material crystallized on long standing to a light yellow solid melting at about 30° C. The structure of the product as 3,3'-dicyclohexyl-4,4'-dihydroxybenzophenone was verified by infrared examination. Elemental analysis showed: carbon, 78.53% and hydrogen, 7.76%. Calculated: carbon, 79.3% and hydrogen, 7.93%.

By procedures similar to those shown above, there are prepared other biphenols, oxybisphenols, and carbonylbisphenols of the same general structure and having at least one cycloalkyl group ortho to each hydroxyl group in the molecule. Representative compounds are 4,4'-oxybis(2-cyclopentylphenol), 4,4'-oxybis(6-cyclohexyl-o-cresol), 4,4'-oxybis(2,6-dicyclohexylphenol), 4,4'-oxybis(2-cyclooctylphenol), 3,3'-dicyclopentyl-4, 4'-dihydroxybenzophenone, 3,3' - dibutyl - 5,5'-dicyclohexyl-4,4'-dihydroxybenzophenone, and 3,3'-dicyclooctyl-4, 4-dihydroxybenzophenone.

Normally solid polymers of α-olefins, for example, polyethylene, polypropylene, polybutene, polybutadiene, poly(4-methyl-1-pentene), polystyrene, and mixed polymers such as ethylene-propylene copolymers including physical mixtures of polyolefins as well as polymers obtained by the copolymerization of mixed monomers and other such mixtures are protected against degradative oxidation to a surprisingly high degree by incorporation in them of relatively small amounts of these bis(cycloalkylphenols). These compounds are also effective stabilizers in hydrocarbon fractions such as gasoline, diesel fuel, lubricating oils, and similar products to protect these materials from oxidative degradation.

As stabilizers in polyolefins, the compounds of this invention are employed in proportions of about 0.001% to about 1.0% by weight of the composition, depending upon the particular polymer and the degree of stability required. In most cases, 0.01% to about 0.5% is preferred. These stabilizers exhibit their protective effect most strikingly and are therefore preferably used in combination with a similar quantity, that is, about 0.02% to about 1.0% by weight of an auxiliary antioxidant known to promote the stabilizing efficiency of phenolic compounds. Suitable auxiliary antioxidants include in particular higher alkyl diesters of thiodialkanoic acids, for example, the dilauryl and distearyl esters of 3,3'-thiodipropionic acid whose mixtures with phenolic antioxidants show synergistic stabilizing efficiencies.

In a representative procedure, a bisphenol stabilizer is compounded with a polyolefin and the composition is tested as shown below.

An essentially linear, crystalline polypropylene was employed for testing. About 300 g. of granular polypropylene having a melt index of about 3 is stirred in an open container with about 200 ml. of a methylene chloride solution of the additive or additives to be tested. Stirring is continued until nearly all the methylene chloride has evaporated and the additive has been thoroughly dispersed. The treated polypropylene is dried at 60° C. under nitrogen in a vacuum oven for about 4 hours. The additive or mixture of additives is then further mixed with the polymer by extrusion at about 250° C. The extruded plastic, after being converted into pellet form for handling, is then compression-molded at about 230° C. into 100 mil thick samples. These test pieces are exposed in a circulating air oven at 150° C. and are examined periodically until the first signs of degradation are noted. This oxidative degradation shows up as the formation of spots of powdery disintegration of the solid structure and is usually associated with a slight darkening of the polymer. The time in hours to reach this point is referred to as the "oven-life" and where two values are given in the following table under this heading for a particular composition, these are respectively the time of the last observation when the sample appeared unchanged and the time of the next observation when signs of degradation were first apparent.

Some representative test results using these new compounds as stabilizers are shown in Table I and results obtained with known bisphenol stabilizers are included for comparison. In each case, 0.05% by weight of the bisphenol and 0.25% by weight of dilauryl 3,3′-thiodipropionate (DLTDP) was incorporated into the polymer sample.

TABLE 1

| Additive: | Oven-life, hrs. |
|---|---|
| None | Less than 4 |
| 4,4′-oxybis(2-cyclohexylphenol) +DLTDP | 1460–1520 |
| 2,2′-dicyclohexyl-4,4′-biphenol +DLTDP | 1600–1720 |
| 4,4′-thiobis(2-cyclohexylphenol) +DLTDP | 1300–1380 |
| 4,4′-methylenebis(2-cyclohexylphenol) +DLTDP | 880–900 |
| Polybutylated bisphenol A+DLTDP | 650–710 |

In addition to the above, a sample of polypropylene containing 0.05% of 3,3′-dicyclohexyl-4,4′-dihydroxybenzophenone and 0.25% DLTDP was found to be effectively stabilized. By way of comparison, samples of polypropylene containing about 0.1% by weight of any of the bisphenols alone had oven-lives of about 50–80 hours while samples containing about 0.5% of DLTDP as the sole stabilizer showed oven-lives of less than 500 hours.

Homologous 4,4′-oxybis(2-cycloalkylphenols), 2,2′-dicycloalkyl-4,4′-biphenols, 3,3′-dicycloalkyl-4,4′-dihydroxybenzophenones, and their alkyl and cycloalkyl substituted derivatives are similarly found to stabilize polyolefins and hydrocarbon fractions effectively against oxidative degradation. Other thermoplastic compositions are also stabilized against such deterioration by these compounds.

We claim:

1. A thermoplastic polymerized alpha-olefin composition having incorporated therein a small but stabilizing quantity of a compound having the structure

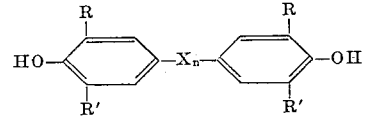

wherein R is cycloalkyl of 4–8 carbon atoms, R′ is hydrogen, lower alkyl, or cycloalkyl of 4–8 carbon atoms, X is oxygen or carbonyl, and $n$ is an integer from zero to one.

2. A composition as described in claim 1 wherein there is additionally incorporated a stabilizing quantity of a higher alkyl diester of a thiodialkanoic acid.

3. A composition as described in claim 2 wherein the polymerized alpha-olefin is polypropylene.

4. Polypropylene having incorporated therein from about 0.001% to about 1.0% by weight of a diphenol having the structure defined in claim 1 and from about 0.02% to about 1.0% by weight of a higher alkyl diester of 3,3′-thiodipropionic acid.

5. The polypropylene composition of claim 4 wherein the diphenol is 2,2′-dicyclohexyl-4,4′-biphenol.

6. The polypropylene composition of claim 4 wherein the diphenol is 4,4′-oxybis(2-cyclohexylphenol).

7. The polypropylene composition of claim 4 wherein the diphenol is 3,3′-dicyclohexyl-4,4′-dihydroxy-benzophenone.

References Cited by the Examiner

UNITED STATES PATENTS

| 2,285,563 | 6/1942 | Britton et al. | 260—620 |
| 3,100,229 | 8/1963 | Orloff | 260—45.95 |
| 3,153,098 | 10/1964 | Boag | 260—45.95 |

LEON J. BERCOVITZ, *Primary Examiner.*

GEORGE F. LESMES, *Examiner.*

G. W. RAUCHFUSS, V. P. HOKE, *Assistant Examiners.*